UNITED STATES PATENT OFFICE.

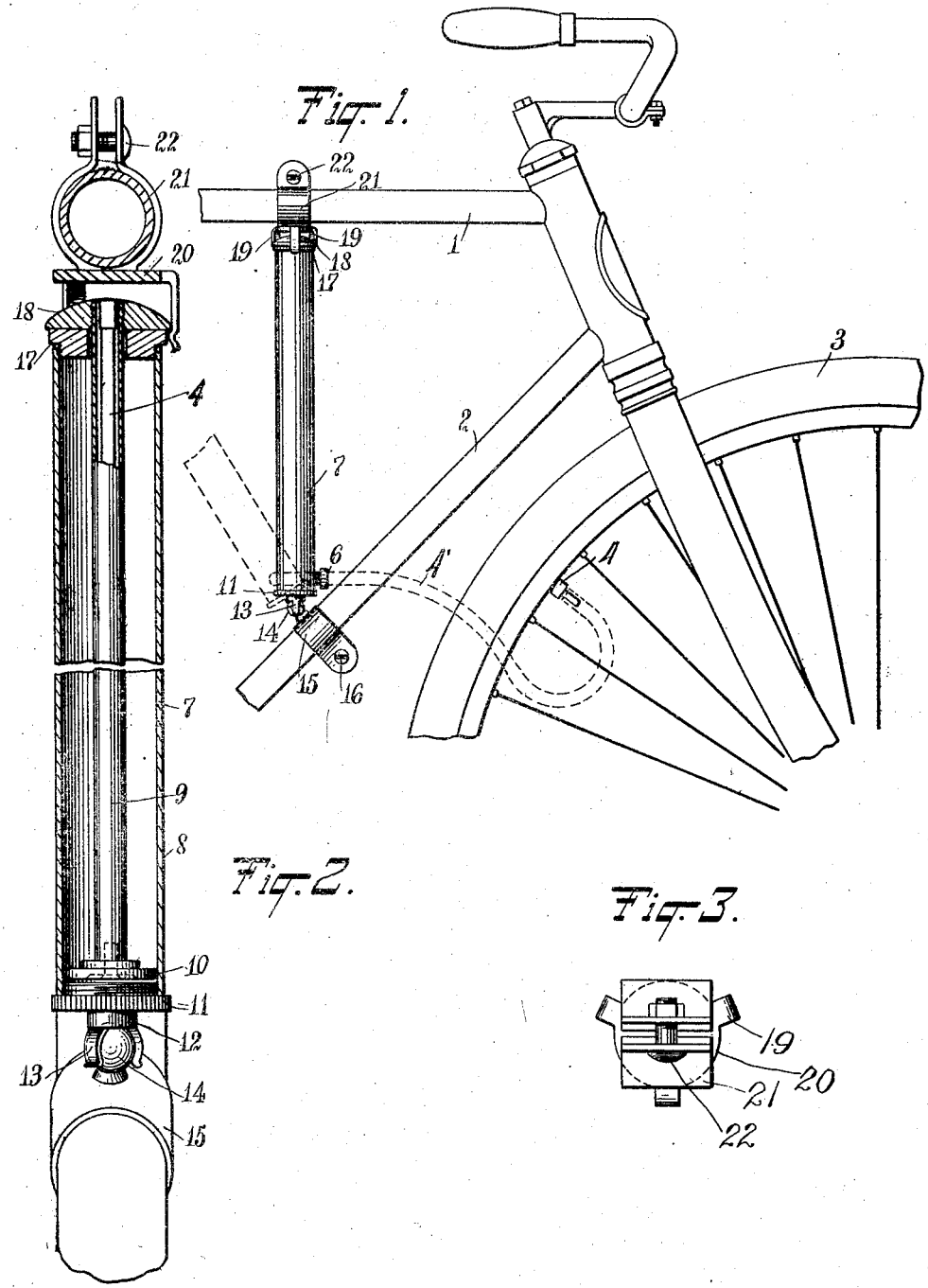

ELISHA B. WRIGHT, OF ST. HELENA, CALIFORNIA.

BICYCLE-PUMP.

1,056,617.   Specification of Letters Patent.   Patented Mar. 18, 1913.

Application filed May 8, 1912. Serial No. 695,855.

*To all whom it may concern:*

Be it known that I, ELISHA B. WRIGHT, a citizen of the United States, and a resident of St. Helena, in the county of Napa and State of California, have invented a new and Improved Bicycle-Pump, of which the following is a full, clear, and exact description.

This invention relates to improvements in bicycle pumps, and has for an object to provide an improved pump and supporting devices adapted to hold the pump for fitting in a proper position on the bicycle frame for ready operation at all times.

A further object of the invention is to provide a plurality of retaining members and a pump structure on a bicycle frame so that the pump will be continually in position for operation but out of the way of the operation of the bicycle.

In carrying out the objects of the invention, an encircling clip is provided for the upper bar and lower bar of a bicycle frame provided with suitable interlocking retaining means designed to engage a pump. The pump is adapted to be universally pivoted to the lower clamp and is usually not removed therefrom, while it is easily disconnected from the upper clamp so as to be operated. A hose is connected to the pump and is arranged so as to be easily connected with the valve or either of the bicycle wheels when it is desired to pump up the tires thereof.

A practical embodiment of the invention is represented in the accompanying drawings forming a part of this specification, in which similar characters of reference indicate corresponding parts in all the views.

Figure 1 is a fragmentary side view of the front of a bicycle, showing an embodiment of the invention applied thereto; Fig. 2 is an enlarged sectional view through a pump and associated parts embodying the invention; and Fig. 3 is a top plan view of the pump and clamp shown in Fig. 2.

Referring to the accompanying drawings by numerals, 1 and 2 indicate the top and lower bars of a bicycle frame, and 3 the front tire of the bicycle which is provided with the usual valve structure 4, to which a flexible tube 5 may be connected whenever desired. The flexible tube 5 is connected at 6 to a pump 7 when the pump is being used for pumping up the tire 3. If desired to pump up the rear tire, all that is necessary is to remove the tube from the valve of the front tire and connect the same with the valve of the rear tire. The pump 7 is formed with an outer casing 8, a piston rod 9, a piston 10 provided with the usual washer. The piston 10 is adapted to be reciprocated back and forth in the cylinder 8 in the usual manner for forcing air out of the valve 6, the valve 6 being of the usual construction, namely a check valve. The casing 8 is provided with a base 11 having an extension 12 connected therewith in any desired manner. The extension 12 is provided with a plurality of resilient clamping members 13 adapted to fit over a ball 14 connected to the clamp 15. The clamp 15 is held in place by a suitable bolt 16 and may be adjusted to any desired place on the bar 2. By arranging the arms and fingers 13 over a ball 14, the pump 7 is substantially universally connected with the clamp 15 and cannot be readily removed. The outer end of the pump is provided with the usual upper end or covering 17 and with a handle portion 18 connected to the piston 9, the upper end being provided with the usual aperture for accommodating the piston 9 in its back and forth movement.

When the pump 7 is in use the same is moved from the position shown in Fig. 1 to substantially the position shown in dotted lines in Fig. 1, and then the piston 10 operated in the usual manner. After the operator is through using the pump the same is forced back to the position shown in Fig. 1, wherein the fingers 19 snap over the upper part of the pump and especially over the handle 18. The fingers 19 are of resilient material and permit the pump to be moved into engagement and from engagement whenever desired. Preferably the fingers 19 are formed integral with the plate 20, to which is secured a clamp 21 held in place by a suitable bolt 22. When the pump is not in operation the same is held between the bars 1 and 2 as shown in Fig. 1, and consequently out of the way. When it is desired to operate the pump the same is moved pivotally to the dotted position shown in Fig. 1, or to any other position, without removing the ball from the pump and then it is operated.

In arranging the pump on the bars 1 and 2, the same is preferably positioned so that the tube 4' may easily reach the valve 4, and also may be of such a length as to be inserted in the tubular piston rod 9. When the tube 4' is not in use, as shown in dotted lines in Fig. 1, a suitable cap is fitted over the outer portion of the valve 6 for protecting the same against the entrance of dirt and other foreign matter.

Having thus described my invention I claim as new and desire to secure by Letters Patent:—

1. In a device of the character described, a pump structure, a plurality of encircling fingers extending from the bottom thereof, said fingers being spaced a substantially equal distance apart and in a circle, a ball fitting into said fingers formed with an extension, a clamp engaging said extension for holding said ball in a predetermined position, and means for holding the upper end of said pump structure in a predetermined position.

2. In a device of the character described, the combination with a bicycle frame, of a clamping member arranged on the upper and lower bars, a plurality of fingers extending from the upper clamping member, a ball extending from the lower clamping member, a pump structure having its upper end removably positioned in said fingers, and a plurality of clamping members engaging said ball arranged at the lower end of said pump structure.

3. In a device of the character described, the combination with a bicycle frame, of a pump structure, means for universally journaling the lower end of said pump structure to one of the lower bars of said frame, and means for removably connecting the upper end of said pump structure to one of the upper bars of said frame, said means including a plurality of resilient fingers arranged substantially in a circle having overlapping projections for engaging the upper end of said pump structure.

In testimony whereof I have signed my name to this specification in the presence of two subscribing witnesses.

ELISHA B. WRIGHT.

Witnesses:
J. H. STEVES,
W. B. KETLER.

---

Copies of this patent may be obtained for five cents each, by addressing the "Commissioner of Patents, Washington, D. C."